US005337459A

United States Patent [19]

Hogan

[11] Patent Number: 5,337,459

[45] Date of Patent: Aug. 16, 1994

[54] MAGNETICALLY RELEASABLE CLAMP

[75] Inventor: Dennis L. Hogan, St. Petersburg, Fla.

[73] Assignee: Security Tag Systems, Inc., Deerfield Beach, Fla.

[21] Appl. No.: 32,145

[22] Filed: Mar. 16, 1993

[51] Int. Cl.[5] ........ F16G 11/00

[52] U.S. Cl. ........ 24/136 A; 24/16 R; 24/115 L; 24/706.8

[58] Field of Search ........ 24/704.1, 703.1, 706.8, 24/704.2, 16 R, 136 A, 115 L, 25; 70/57.1

[56] References Cited

U.S. PATENT DOCUMENTS

| | | | |
|---|---|---|---|
| 652,337 | 6/1900 | Taylor | 70/38 A |
| 1,492,853 | 5/1924 | Johnson | 24/706.8 |
| 1,542,442 | 6/1925 | Fraim | 70/39 |
| 1,543,397 | 6/1925 | Schroeder | 70/39 |
| 1,593,683 | 7/1926 | Anakin | 70/276 |
| 1,617,330 | 2/1927 | Hallihan | 24/706.8 |
| 1,662,612 | 3/1928 | Junkune | 70/55 |
| 3,566,636 | 3/1971 | Rudolf et al. | 70/276 |
| 3,668,681 | 6/1972 | Kaplan | 340/280 |
| 3,858,280 | 1/1975 | Martens | 24/150 R |
| 3,866,205 | 2/1975 | Payne et al. | 340/280 |
| 3,995,900 | 12/1976 | Humble et al. | 70/57.1 |
| 4,012,813 | 3/1977 | Martens et al. | 24/150 R |
| 4,074,916 | 2/1978 | Schindler | 24/136 A |
| 4,129,927 | 12/1978 | Anderson | 24/136 A |
| 4,221,025 | 9/1980 | Martens et al. | 24/150 R |
| 4,226,100 | 10/1980 | Hampton et al. | 70/55 |
| 4,317,344 | 3/1982 | Barnard | 70/55 |
| 4,483,049 | 11/1984 | Gustavsson et al. | 24/160 |
| 4,527,310 | 7/1985 | Vandebult | 24/150 R |
| 4,590,461 | 5/1986 | Cooper | 340/572 |
| 4,649,397 | 3/1987 | Heaton et al. | 343/895 |
| 4,651,136 | 3/1987 | Anderson et al. | 340/572 |
| 4,670,950 | 6/1987 | Wisecup et al. | 24/150 R |
| 4,698,620 | 10/1987 | Marshall | 340/568 |
| 4,903,383 | 2/1990 | Gartshore | 24/706.8 |
| 5,022,244 | 6/1991 | Charlot, Jr. | 70/57.1 |
| 5,054,172 | 10/1991 | Hogan et al. | 70/57.1 |
| 5,140,836 | 8/1992 | Hogan | 70/57.1 |

FOREIGN PATENT DOCUMENTS

| | | | |
|---|---|---|---|
| 1928316 | 12/1970 | Fed. Rep. of Germany | 70/276 |
| 0521842 | 7/1921 | France | 24/706.8 |
| 12223 | of 1895 | United Kingdom | 70/39 |
| 644006 | 10/1950 | United Kingdom | 70/39 |

*Primary Examiner*—Victor N. Sakran
*Attorney, Agent, or Firm*—Edward W. Callan

[57] ABSTRACT

A clamp includes a U-shaped member having a pair of legs, with each leg having a cavity in the side of the leg facing the other leg; and a clutch for receiving and restraining the legs of the U-shaped member. Pads are attached to the insides of the legs for clamping an article between the legs to deter the theft of such article. The clutch includes a housing defining a pair of longitudinal channels for respectively receiving the legs of the U-shaped member and a chamber between the channels, with the chamber being open to the channels; two balls disposed for movement within the chamber; a highly magnetically attractive plunger disposed within and at one end of the chamber; and a spring for biasing the plunger to move into such contact with the balls as to force the balls against respective inclined surfaces disposed at the other end of the chamber for respectively guiding the balls toward different channels. When the legs of the U-shaped member are inserted into the channels so that the cavities are respectively adjacent the balls while the plunger is forcing the balls against the inclined surfaces, the inclined surfaces guide the balls respectively into the cavities and into contact with portions of the respective legs adjacent the respective cavities to thereby restrain the legs of the U-shaped member in the housing. To release the legs from the clutch, a magnet is placed adjacent the one end of the housing to magnetically attract the plunger and the balls toward the one end of the chamber and thereby release each ball from a locked position between the respective inclined surface and the portion of the leg that contacts the ball.

16 Claims, 1 Drawing Sheet

MAGNETICALLY RELEASABLE CLAMP

BACKGROUND OF THE INVENTION

The present invention generally relates to clamps and is particularly directed to a releasable clamp that can be attached to merchandise to deter theft of the merchandise.

Several embodiments of magnetically releasable clamps that can be attached to merchandise are described in U.S. Pat. No. 5, 140,836 to Dennis L. Hogan and Donald J. Beach. Such clamps are suited for attachment to jewelry, such as necklaces, bracelets and watches, as well as other merchandise, such as eyeglasses. These clamps include a U-aped member having a pair of legs and a clutch for receiving and restraining the legs of the U-shaped member. Pads are attached respectively to the clutch housing and the U-shaped member for clamping an article of merchandise between the pads when the legs of the U-shaped member are inserted into the clutch.

SUMMARY OF THE INVENTION

The present invention provides an improved releasable clamp that is of less complex construction than the clamps referred to above.

The clamp of the present invention includes a U-shaped member having a pair of legs, with at least one said leg having a cavity in the side d said leg and facing the other said leg; a clutch for receiving the legs of the U-shaped member and for restraining said at least one said leg, wherein the clutch includes a housing defining a pair of longitudinal channels for respectively receiving the legs of the U-shaped member and a chamber between the channels, with said chamber being open to at least one said channel; a ball disposed for movement within the chamber; a spring disposed at one end of the chamber for biasing the ball toward the other end of the chamber; and guide means disposed at the other end of the chamber for guiding the ball toward said at least one said channel when the ball is biased toward the other end of the chamber; and wherein, when the legs of the U-shaped member are inserted into said channals so that the cavity in said at least one said leg is adjacent the ball while the spring is biasing the ball toward the other end of the chamber, the guide means guide the ball into the cavity and into contact with a portion of said at least one said leg adjacent the cavity to thereby restrain the U-shaped member in the housing.

Preferably, both legs have a said cavity, the chamber is open to both channels, two balls are disposed in the chamber for movement between the plunger and the other end of the chamber, and the guide means guide the balls respectively into said cavities and into contact with portions of the respective legs adjacent the respective cavities to thereby restrain both legs of the U-shaped member in the housing.

In a broad aspect, me clamp of me present invention includes a member having a cavity-defining portion; a clutch for receiving and for restraining said member, wherein the clutch includes a housing defining a channel for receiving the cavity-defining portion of said member and a chamber that is open to said channel; a ball disposed for movement within the chamber; a spring disposed at one end of the chamber for biasing the ball toward the other end of the chamber; and guide means disposed at the other end of the chamber for guiding the ball toward the channel when the ball is biased toward the other end of the chamber; and wherein, when the cavity-defining portion of the member is inserted into the channel so that the cavity is adjacent the ball while the spring is biasing the ball toward the other end of the chamber, the guide means guide the ball into the cavity and into contact with the cavity-defining portion of said member to thereby restrain said member in the housing.

Additional features of the present invention are described in relation to the detailed description of the preferred embodiment.

DETAILED DESCRIPTION

Figures 1A, 1B, 2, 3, 4:
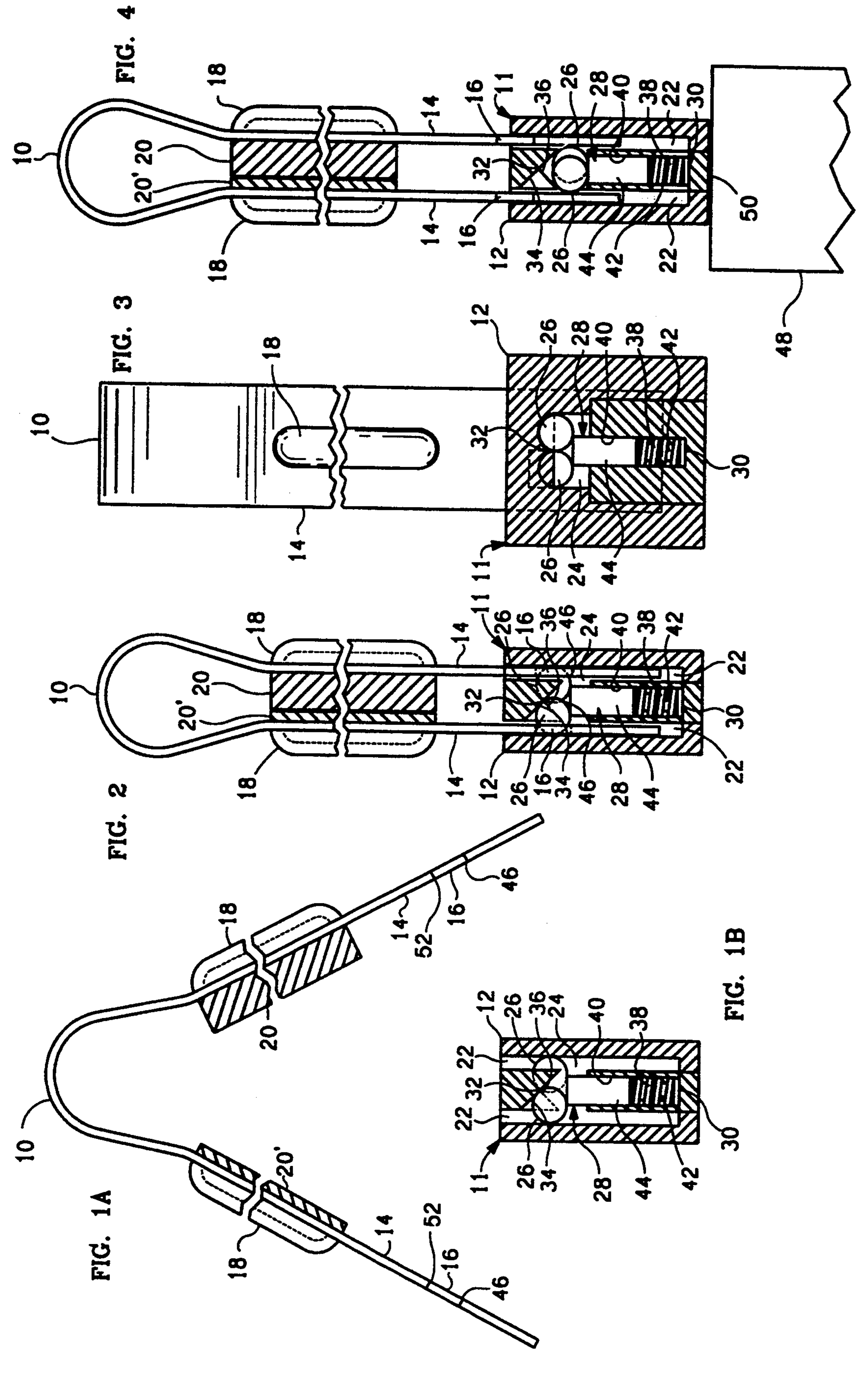
FIG. 1A is a side view of a U-shaped member included in a preferred embodiment of the clamp of the present invention.
FIG. 1B is a sectional view of a clutch included in the preferred embodiment of the clamp of the present invention.
FIG. 2 side sectional view showing the U-shaped member of FIG. 1A restrained in the clutch of FIG. 1B.
FIG. 3 is an end sectional view showing the U-shaped member of FIG. 1A restrained in the clutch of Figure 1B.
FIG. 4 side sectional view showing the U-shaped member of FIG. 1A in the clutch of FIG. 1B, with the plunger and the balls attracted to such a position by a magnet as to release the restraint of the clutch upon the U-shaped member.

Referring to FIGS. 1A and 1B, a preferred embodiment of the clamp of the present invention includes a U-shaped member 10 and a complementary clutch 11 embodied in a housing 12.

The U-shaped member 10 has a pair of legs 14, with each leg 14 having a cavity 16 in the side of each leg 14 facing the other leg 14. Preferably, each cavity 16 is a round hole extending through the leg 14.

The U-shaped member 10 also includes a supporting rib 18 on the side of the each leg 14 not facing the other leg 14 to keep the legs 14 strong and straight.

Each leg 14 is elongated and has a pad 20, 20' attached thereto on the side of the leg 14 facing the other leg 14 and extending laterally toward the other leg 14 for securely gripping an article of merchandise (not shown) . One pad 20 is a compressible rubber pad and the other pad 20' is a non-skid pad having enhanced lateral gripping characteristics. The portions of the rubber pad 20 that are not fully compressed by contact with a gripped article also prevents lateral movement of the article, which is held at a greater depth in the fully compressed portion of the rubber pad 20. This embodiment of the clamp is better suited for attachment to articles of clothing than the prior art clamps described in the aforementioned U.S. Pat. No. 5,140,836.

The U-shaped member 10 preferably is made of a single piece of spring steel and is shaped like a hairpin so that the legs 14 spring outward and assume non-parallel positions when the U-shaped member 10 is in a relaxed state, but alternatively may be made of other materials and have the legs 14 hinged together at the closed end of the "U" and disposed parallel to each other when in a relaxed state. Movement of the legs from their outward non-parallel positions better enables the pads 20, 20' to tightly grip the article of merchandise since the article can readily be placed between the pads 20, 20' when the legs 14 are disposed outward from their parallel positions and the pads 20, 20' can be more compressed when the legs 14 are swung through an arc from their non-parallel positions to their parallel positions in which they are inserted into the housing 12. The U-shaped member may be made of either magnetic or non-magnetic material.

The clutch 11 includes a housing 12, which defines a pair of longitudinal channels 22 for respectively receiving the legs 14 of the U-shaped member 10 and a chamber 24 between the channels 22. The chamber 24 is open to the channels 22.

There are two balls 26 disposed for movement within the chamber 24. Preferably, both balls 26 are made of a magnetically attractive material, such as magnetically attractive stainless steel. Each ball 26 has a diameter that is slightly less than the diameter of each cavity 16.

A magnetically attractive plunger 28 is disposed within and at one end 30 of the chamber 24. In the preferred embodiment, the plunger 28 is made of highly magnetic soft iron.

At the other end of the chamber 24, the housing 12 defines an abutment wall 32, having a first inclined surface 34 and a second inclined surface 36. The abutment wall 32 functions as a guide means.

A coiled compression spring 38 is disposed within a hollow cylindrical portion 40 of the chamber 24 and rests against an inner wall of the housing 12 at the one end 30 of the chamber 24 for biasing the plunger 28 to move into such contact with the balls 26 as to force the balls 26 against the respective first and second inclined surfaces 34, 36 of the abutment wall 32. The plunger 28 is restrained from lateral movement by the walls of the cylinder 40. The plunger 28 includes two telescoping cylinders 42, 44, with the inner cylinder 42 being disposed within the coiled spring 38, and the outer cylinder 44 providing a shoulder upon which one end of the coiled spring 38 applies pressure for biasing the outer cylinder 44 of the plunger 28 to move toward the abutment wall 32.

The spring 38 and the legs 14 are made of a slightly magnetic stainless steel, or a similar material: although either or both the spring 38 and the legs 14 may be made of a nonmagnetic material.

When the legs 14 of the U-shaped member 10 are inserted into the channels 22 of the housing 12, while the plunger 28 is forcing the balls 26 against the inclined surfaces 34, 36 of the abutment wall 32, as shown in FIGS. 2 and 3, the inclined surfaces 34, 36 respectively guide the balls 26 toward different channels 22 and into the cavities 16 in the different legs 14 so that the balls 26 contact portions 46 of the legs 14 adjacent the respective cavities 16 to thereby restrain both legs 14 of the U-shaped member 10 in the housing 12. Since the cavities 16 have a greater diameter than the balls 26, when the balls 26 are guided into the cavities 16, the balls 26 also contact and come to rest against the outer walls of the channels 22.

The diameter of each ball 26 is greater than the shortest distance between the respective inclined surface 34, 36 of the abutment wall 32 and the portion 46 of the respective leg 14 that contacts the ball 26 in order to prevent the ball 26 from slipping from a locked position between the contacted portion 46 of the leg 14 and the respective inclined surface 34, 36 of the abutment wall 32.

Although it is preferred in the interest of size and economy to use a single plunger 28 for forcing both balls 26 against the inclined surfaces 34, 36 of the abutment wall 32, separate plungers and springs could be used for forcing the balls against separate respective inclined surfaces and the balls could be isolated from one another in separate chambers.

In order to release the U-shaped member 10 from the clutch 11, a magnet 48 is placed next to the bottom 50 of the housing 12 in order to attract the plunger 28 toward the one end 30 of the chamber 24, so that the plunger 28 ceases to force the balls 26 against the inclined surfaces 34, 36 of the abutment wall 32, as shown in FIG. 4; whereby the balls 26 can move out of the cavities 16 in the legs 14 and thereby no longer restrain the legs 14 of the U-shaped member 10 from removal from the housing 12.

If the balls 26 are not held in a locked position between the contacted portion 46 of the leg 14 and the respective inclined surface 34, 36 of the abutment wall 32 when the plunger 28 is magnetically attracted by the magnet 48 to move toward the one end 30 of the chamber 24, the magnetically attractive balls 26 maintain contact with the magnetically attractive plunger 28 and are attracted away from the inclined surfaces 34, 36 of the abutment wall 32 and out of the cavities 16 in the legs 14 to the positions shown in FIG. 4. This occurs even in those embodiments in which the legs 14 are made of magnetically attractive material, which also magnetically attracts the balls 26. In such embodiments, such magnetic attraction causes the balls 26 to also maintain contact with the legs 14 while pivoting about the contacted portions 46 of the legs 14 as the balls 26 are drawn out of the cavities 16 and to the positions shown in FIG. 4 by the magnetic attraction of the plunger 28 as the plunger 28 completes its movement to the one end 30 of the chamber 24.

If the balls 26 are held in a locked position between the contacted portion 46 of the leg 14 and the respective inclined surface 34. 36 of the abutment wall 32 when the plunger 28 is magnetically attracted by the magnet 48 to move toward the one end 30 of the chamber 24, the contact between the balls 26 and the plunger 28 may be broken upon such movement of the plunger 28 notwithstanding the magnetic attraction between the balls 26 and the plunger 28.

The location of the cavities 16 in the legs 14 is such that when the balls 26 have been guided into the cavities 16, the legs 14 are not fully inserted into the longitudinal channels 22, so that when the plunger 28 is moved toward the one end 30 of the chamber 24, the legs 14 can be inserted further into the channels 22 after the plunger 28 has been moved toward the one end 30 of the chamber 24. When the legs 14 are inserted further into the channels 22 after the plunger 28 has been moved to the one end 30 of the chamber 24, the balls 26 remain in contact with the legs 14 and also either maintain or resume contact with the plunger 28, whereupon the balls 26 are moved out of the cavities 16 and to their positions shown in FIG. 4 as the result of either the magnetic attraction of the plunger 28 or being forced into such positions by being contacted and pushed into such positions by the portions 52 (FIG. 1) of the legs 14 on the opposite sides of the cavities 16 from the respective portions 46 as the legs 14 are being further inserted into the channels 22.

Once the balls 26 have been moved out of the cavities 16, as shown in FIG. 4, the legs 14 can be extracted from the channels 22 of the clutch housing 12 without the balls 26 moving back into the cavities 16 as the legs 14 are being withdrawn because the magnetic attraction between the balls 26 and the plunger 28 is greater than the magnetic attraction between the balls 26 and the legs 14 due to the plunger 28 being located closer to the magnet 48 than the legs 14, whereby the balls 26 maintain contact with the plunger 28 and break contact with the legs 14 as the legs 14 are exacted from the channels 22.

In an alternative embodiment of the clamp of the present invention, the plunger 28 is not made of a magnetically attractive material, but rather is moved toward the one end 30 of the chamber 24 by mechanical means (not shown) instead of by magnetic attraction when it is desired to release the U-shaped member 10 from the clutch 11. For example, the bottom of the plunger 28 includes a lock (not shown) into which a key (not shown) can be inserted through an opening (not shown) in the bottom of the housing 12 and turned in order to be retained in the plunger 28 so that by pulling upon the inserted and turned key, the plunger 28 can be moved toward the one end 30 of the chamber 24, so that the plunger 28 no longer forces the balls 26 to remain in their locked position when the legs 14 are inserted further into the channels 22. In this embodiment, neither the balls 26 nor the legs 14 of the U-shaped member 10 are made of magnetically attractive material.

I claim:

1. A clamp, comprising
- a U-shaped member having a pair of legs, with at least one said leg having a cavity in the side of said leg facing the other said leg; and
- a clutch for receiving the legs of the U-shaped member and for restraining said at least one said leg, wherein the clutch includes
- a housing defining a pair of longitudinal channels for respectively receiving the legs of the U-shaped member and a chamber between the channels, with said chamber being open to at least one said channel;
- a ball disposed for movement within the chamber;
- a spring disposed at one end of the chamber for biasing the ball toward the other end of the chamber; and
- guide means disposed at the other end of the chamber for guiding the ball toward said at least one said channel when the ball is biased toward the other end of the chamber; and
- wherein, when the legs of the U-shaped member are inserted into said channels so that the cavity in said at least one said leg is adjacent the ball while the spring is biasing the ball toward the other end of the chamber, the guide means guide the ball into the cavity and into contact with a portion of said at least one said leg adjacent the cavity to thereby restrain the U-shaped member in the housing.

2. A clamp according to claim 1, wherein the guide means comprise an abutment wall having an inclined surface for guiding the ball into the cavity in said at least one said leg.

3. A clamp according to claim 2, wherein the diameter of the ball is greater than the shortest distance between the abutment wall and the portion of said at least one said leg that contacts the ball.

4. A clamp according to claim 3, wherein the location of the cavity in said at least one said leg is such that when the ball has been guided into the cavity, said at least one said leg is not fully inserted into said at least one said channel so that when the spring does not bias the ball into contact with the guide means said at least one said leg can be inserted further into said at least one said channel to thereby release the ball from a locked position between the abutment wall and the portion of the leg that contacts the ball.

5. A clamp according to claim 1, wherein each leg has a pad attached thereto on the side of said leg facing the other said leg and extending laterally toward the other said leg.

6. A clamp according to claim 5, wherein the U-shaped member is made of a piece of spring steel and is shaped so that the legs spring outward and assume non-parallel positions when the U-shaped member is in a relaxed state.

7. A clamp according to claim 1, further comprising
- a plunger disposed within and at said one end of the chamber and biased by the spring to move into such contact with the ball as to force the ball against the guide means.

8. A clamp according to claim 7, wherein the plunger and the ball are magnetically attractive.

9. A clamp, comprising
- a U-shaped member having a pair of legs, with each leg having a cavity in the side of said leg facing the other said leg;
- a clutch for receiving and restraining the legs of the U-shaped member, wherein the clutch includes
- a housing defining a pair of longitudinal channels for respectively receiving the legs of the U-shaped member and a chamber between the channels, with said chamber being open to the channels;
- two balls disposed for movement within the chamber;
- a spring disposed at one end of the chamber for biasing the balls toward the other end of the chamber; and
- guide means disposed at the other end of the chamber for guiding the respective balls toward different channels when the balls are biased toward the other end of the chamber; and
- wherein, when the legs of the U-shaped member are inserted into said channels so that the cavities are respectively adjacent the balls while the spring is biasing the balls toward the other end of the chamber, the guide means guide the balls respectively into said cavities and into contact with portions of the respective legs adjacent the respective cavities to thereby restrain both legs of the U-shaped member in the housing.

10. A clamp according to claim 9, wherein the guide means comprise an abutment wall having a first inclined surface for guiding one of the balls into the cavity in one of the legs, and a second inclined surface for guiding the other ball into the cavity in the other leg.

11. A clamp according to claim 10, wherein the diameter of each ball is greater than the shortest distance between the abutment wall and the portion of the respective leg that contacts the ball.

12. A clamp according to claim 11, wherein the location of the cavity in each leg is such that when the respective ball has been guided into the cavity, the leg is not fully inserted into said longitudinal channel so that when the spring does not bias the balls toward the other end of the chamber the leg can be inserted further into said channel to thereby release the respective ball from a locked position between the abutment wall and the portion of said one said leg that contacts the ball.

13. A clamp according to claim 9, wherein each leg has a pad attached thereto on the side of said leg facing the other said leg and extending laterally toward the other said leg.

14. A clamp according to claim 13, wherein the U-shaped member is made of a piece of spring steel and is shaped so that the legs spring outward and assume non-parallel positions when the U-shaped member is in a relaxed state.

15. A clamp according to claim 9, further comprising a plunger disposed within and at said one end of the chamber and biased by the spring to move into such contact with the balls as to force the balls against the guide means.

16. A clamp according to claim 15, wherein the plunger and both balls are magnetically attractive.

* * * * *